United States Patent

[11] 3,615,774

| [72] | Inventor | George H. Criss |
| | | Bethel Park, Pa. |
| [21] | Appl. No. | 696,157 |
| [22] | Filed | Jan. 8, 1968 |
| [45] | Patented | Oct. 26, 1971 |
| [73] | Assignee | Dresser Industries, Inc. |
| | | Dallas, Tex. |

[54] PHOSPHATE-BONDED MONOLITHIC REFRACTORY BATCH
8 Claims, No Drawings

[52] U.S. Cl. ........................................ 106/57, 106/58, 106/59, 106/65, 106/67
[51] Int. Cl. ........................................ C04b 35/04, C04b 35/10, C04b 35/48
[50] Field of Search ........................................ 106/57, 58, 59, 65, 69, 55

[56] References Cited
UNITED STATES PATENTS

| 3,383,230 | 5/1968 | Streib et al. .................. | 106/120 |
| 3,475,188 | 10/1969 | Woodhouse et al. ......... | 106/58 |
| 3,179,526 | 4/1965 | Dolph ........................... | 106/65 |
| 3,379,544 | 4/1968 | Burhans et al. ................ | 106/65 |
| 3,403,038 | 9/1968 | Abolins et al. ................ | 106/69 |

*Primary Examiner*—James E. Poer
*Attorneys*—Robert W. Mayer, Raymond T. Majesko and David C. Hanson ABSTRACT: A refractory monolithic refractory batch comprising refractory aggregates reactive with phosphoric acid and phosphoric acid absorbed in exfoliated vermiculite.

PHOSPHATE-BONDED MONOLITHIC REFRACTORY BATCH

BACKGROUND

Refractories are nonmetallic materials used to withstand high temperature. More specifically, they are the materials which are used to build high temperature steelmaking and glassmaking furnaces. Most refractories are supplied as preformed shapes, including brick, which have been formed by extruding or pressing. Not all refractories are supplied as shapes, however. Some refractories, referred to as refractory monoliths, are supplied in a particulate form. These refractories are rammed, cast, or gunned into place as opposed to being built of jointed brickwork, and as a result, are monolithic. Monolithic ramming mixes comprised of particulate refractory material are usually tempered with about 3 percent water and have properties which permit ramming or tamping into place. Monolithic casting mixes are similar to ramming mixes, but are usually tempered with more water and have properties which permit them to be cast, usually with the aid of vibration. Casting and ramming mixes typically contain a refractory cement or binder. The binder must provide linings prepared from ramming and casting mixes with sufficient rigidity to withstand the conditions encountered in the particular furnace. Often the binder is merely temporary and its bond is replaced at elevated temperatures by a ceramic bond formed by sintering and coalescing of the particles comprising the monolithic lining. On the other hand, the binder may become part of the ceramic bond formed at high temperatures. Monolithic gunning mixes are particulate refractory mixes which are pneumatically impacted upon the situs to be lined or repaired. They are tempered with water either prior to being placed in the pneumatic gun or tempered at the nozzle of the gun. Gunning mixes usually contain a quick-setting binder which holds the gunned lining or repair patch where it is emplaced. This invention pertains to refractory monoliths, referred to above, and to refractory mortars which are finely ground preparations capable of becoming plastic and trowelable when tempered with water and suitable for laying and bonding refractory brick or shapes.

Binders used in refractory monoliths and mortars are numerous and include sulfite lye, sodium silicate, molasses, dextrine, starch, gelatin, calcium aluminate cements, Epsom salts, and any number of phosphates. With the exception of the phosphate binders, most refractory binders lose their strength on heating well below the temperature at which ceramic bonds are formed. Phosphate binders, on the other hand, develop bonds on heating which remain relatively strong at elevated temperatures and, to some extent, participate in the formation of ceramic bonds. Phosphate binders have the additional advantage of providing refractory linings with a certain resistance to wetting by corrosive slags and metals. The phosphates suitable as binders for refractory monoliths and mortars comprise the soluble phosphates, including the sodium phosphate salts, sodium phosphate glasses, ammonium phosphates, and phosphoric acid. Phosphoric acid is well known to be preferable to the other phosphates because of its ability to form much stronger bonds. Unfortunately, because of a tendency of phosphoric acid to react with most refractory aggregates immediately on mixing therewith, it cannot be mixed with particulate refractory aggregates, bagged, stored, and thereafter shipped to the job site without "setting up," thereby rendering the refractory monolith or mortar unusable. Typically, where phosphoric acid is used as a binder for refractory monoliths or mortars, it is added on the job site just prior to tempering with water. This is indeed cumbersome and inconvenient.

It is an object of this invention to provide a refractory monolith or mortar which has a phosphoric acid binder, and which can be shipped in a particulate form premixed with the phosphoric acid but which does not have poor shelf life, that is, which does not set up prior to tempering with water on the job site.

BRIEF DESCRIPTION OF THE INVENTION

According to this invention, a refractory monolithic batch is provided which comprises refractory aggregate reactive with phosphoric acid at room temperature and phosphoric acid absorbed in exfoliated vermiculite. The sized refractory aggregate may be selected from the group consisting of calcined fireclays, calcined bauxite, calcined diaspore, kyanite, mullite, zircon, Bayer process alumina, chromite, forsterite, and zirconia. The batch may comprise a small portion of a refractory aggregate which is highly reactive with phosphoric acid selected, for example, from the group finely divided gibbsite, hydrated alumina, and magnesia. Furthermore, the batch may contain a material known as a plasticizer, typically selected from the group containing crude clays and crude bauxites, and other crude high alumina materials, beneficiated clays and bentonite.

The phosphoric acid should be present in a sufficient amount and concentration to provide between 2 and 10 percent $P_2O_5$, by weight, in the batch. It is preferable to use between 75 and 85 percent concentration phosphoric acid. Exfoliated vermiculite is present in a sufficient amount to absorb all of the phosphoric acid present. Typically, the exfoliated vermiculite is present from 1 to 5 percent, by weight of the batch.

Vermiculite is a term given to a group of hydrous micas characterized by the ability, when heated above 150° C., to expand at right angles to the cleavage to a volume of 6 to 20 times (average 16) that of the unexpanded mineral. Within the group, many subvarieties are known, however, the best known are those specifically and named vermiculite and jefferisite. Other variety names, such as culsageeite, kerrite, maconite, and dudleyite, are usually minor local varieties of the type material and have little significance. It is preferable that the exfoliated vermiculite used in the batches, according to this invention, is sized so that 90 percent is plus 100 mesh and no more than 10 percent is plus 8 mesh.

Refractory monolith and mortar batches, according to this invention, are prepared by first mixing the exfoliated vermiculite with the phosphoric acid. If the weight ratio of acid to exfoliated vermiculite is maintained less than about 4 to 1, the vermiculite, when mixed with the remainder of the batch, will be free flowing.

DETAILED DESCRIPTION

Further features and other objects and advantages of this invention will become clear to those skilled in the art by a careful study of the following detailed description. In this specification and appended claims, all percentages and ratios and parts are by weight. All sizings are measured with the Tyler sieve series.

EXAMPLE I

A high alumina ramming mix is prepared, according to this invention, by first preparing a size-graded batch comprising 60 percent tabular alumina (hard calcined Bayer process alumina) which is sized so that 100 percent passes 3 mesh and at least 40 percent passes 60 mesh, 4½ percent, kyanite, 4 percent crude clay, 25 percent A-2 alumina (lightly calcined Bayer processed alumina substantially all minus 325 mesh). To this batch is added 1½ percent of exfoliated vermiculite which had been mixed with 6 percent, by weight, of the total batch, 85 percent concentration phosphoric acid. The phosphoric acid is absorbed into the exfoliated vermiculite on mixing. The $P_2O_5$ content of this batch is about 3.75 percent. The vermiculite is substantially minus 16 mesh resting on 50 mesh. After the vermiculite and phosphoric acid addition, the batch was dry and free flowing. Thereafter, it is either bagged and shipped, or shipped in bulk to the job site where it is to be used. At the job site, it is tempered with 2 to 4 percent water, if it is to be placed by ramming, that is, with the use of air hammers. Tempered ramming mixes remain crumbly to the touch but compact very dense under the air hammer. Sometimes it is desired that the tempered mix have a plastic consistency in which case the dry mix is tempered with from about 4 to 6 percent water. This example is considered the best mode now known for the practice of this invention.

EXAMPLE II

A refractory gunning mix is prepared according to this invention by first preparing a size-graded batch comprising 74 percent South American bauxite sized such that at least 100 percent passes 3 mesh, but no more than 25 percent passes 65 mesh, 10 percent finely divided crude clay, and 6 percent kyanite. To this batch is added 2 percent exfoliated vermiculite which has been combined with 8 percent, by weight, of the batch, 85 percent concentration phosphoric acid. The $P_2O_5$ content of this batch was about 5.0 percent. After the vermiculite and acid are combined with the remainder of the batch, it remains free flowing and dry to the touch. This batch is then ready to be either bagged and sent to the job site, or sent to the job site in bulk. At the job site, the gunning mix is pneumatically impacted upon it the site to be repaired with about 9 to 10 percent, by weight of the total batch, water added at the nozzle of the pneumatic gun.

EXAMPLE III

A high alumina refractory mortar is prepared according to this invention by preparing a size-graded batch comprising 83 percent calcined South American bauxite sized so that it all passes 28 mesh, at least 60 percent passes minus 65 mesh, and 5 percent crude clay. To this is added 2 percent vermiculite which has been premixed with 10 percent, by weight of the batch, 85 percent concentration phosphoric acid. This batch comprises about 6.2 percent, by weight, $P_2O_5$. On the job, the batch is tempered with approximately 20 percent water, which gives it a good trowelling consistency.

In all of the foregoing examples, prior to tempering with water, the phosphoric acid is present in the batch substantially encapsulated by the exfoliated vermiculite with which it has little, if any, tendency to react. Hence, the phosphoric acid remains unaltered and out of contact with the reactive portions of the refractory batch until the batch is tempered with water just prior to installation. Hence, a phosphoric acid bonded monolithic mix is provided which has no tendency to deteriorate during storage.

Having thus described the invention in detail, and with sufficient particularity as to enable those skilled in the art to practice it, what is desired to have protected by letters patent is set forth in the following claims:

I claim:

1. In a refractory batch comprising refractory aggregate reactive with phosphoric acid and phosphoric acid, the improvement comprising said phosphoric acid being absorbed in exfoliated vermiculite.

2. The batch according to claim 1 in which the refractory aggregate is selected from the group consisting of calcined clays, calcined bauxite, calcined diaspores, kyanite, mullite, zircon, Bayer process alumina, chromite, forsterite, and zirconia.

3. The batch according to claim 1 in which a portion of the refractory aggregate is highly reactive with phosphoric acid and selected from the group consisting of finely divided gibbsite, hydrated alumina, and magnesia.

4. The batch according to claim 1 in which the batch contains a plasticizer.

5. The batch according to claim 4 in which the plasticizer is selected from the group crude clays and crude bauxite, and high alumina materials, beneficiated clays and bentonites.

6. The batch according to claim 1 in which the vermiculite is present from 1 to 5 percent, by weight, of the batch.

7. The batch according to claim 1 in which the phosphoric acid is present in sufficient amount and concentrated to provide between 2 and 10 percent $P_2O_5$ in the batch.

8. The batch according to claim 1 in which the vermiculite is sized 90 percent plus 100 mesh and no more than 10 percent plus 8 mesh.

* * * * *